Nov. 14, 1933. O. VON KEUSSLER ET AL 1,935,529
PROCESS FOR SIMULTANEOUSLY AND CONTINUOUSLY DEHYDRATING
AND RECTIFYING RAW ETHYL ALCOHOL
Filed Jan. 13, 1930
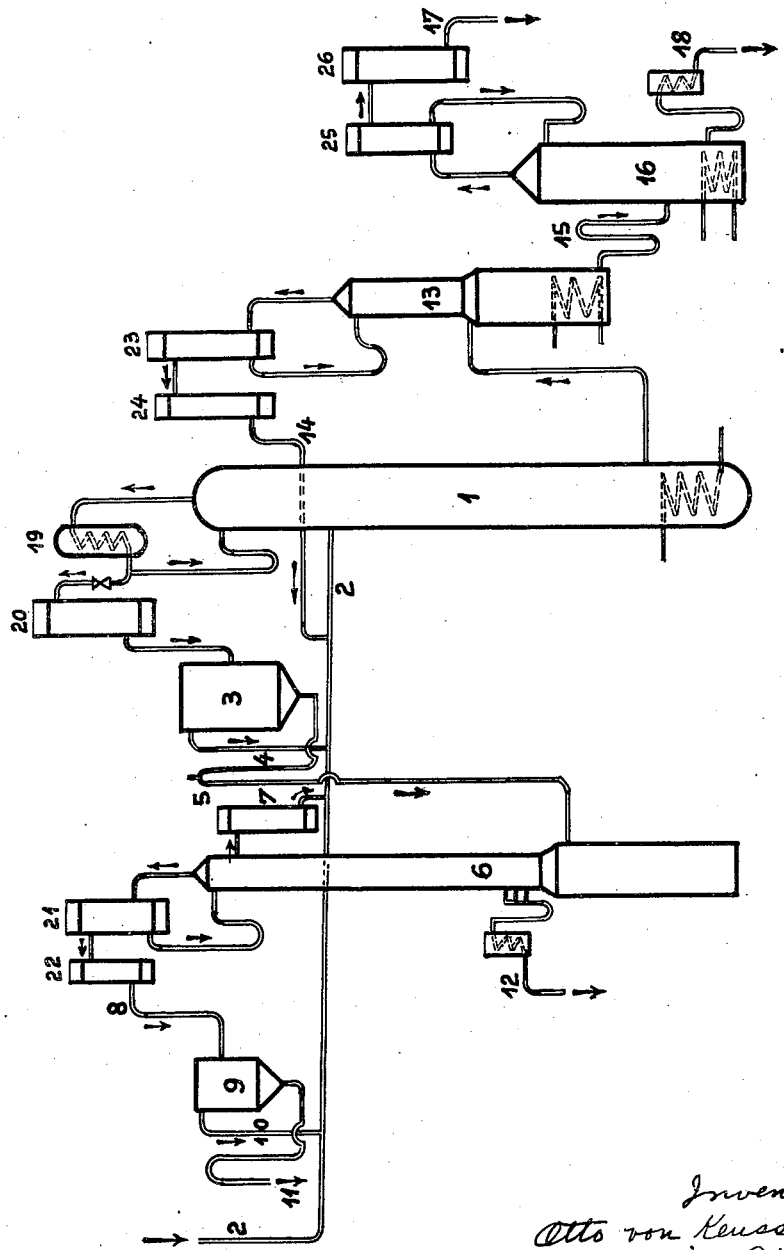
Inventors
Otto von Keussler
and Daniel Peters
By B. Singer,
Atty.

Patented Nov. 14, 1933

1,935,529

UNITED STATES PATENT OFFICE 1,935,529

PROCESS FOR SIMULTANEOUSLY AND CONTINUOUSLY DEHYDRATING AND RECTIFYING RAW ETHYL ALCOHOL

Otto von Keussler and Daniel Peters, Darmstadt, Germany

Application January 13, 1930, Serial No. 420,505, and in Germany January 19, 1929

3 Claims. (Cl. 202—42)

Since the work of Young it has been known (German Patent 142,502) to dehydrate alcohol by the addition of liquids which are miscible with alcohol but not miscible with water and subsequent distillation. It was afterwards shown (German Patent 287,897) that such a distillation could be carried out as a continuous process. In every case previously purified spirit was used as the starting material, so that two series of operations were necessary to obtain absolute alcohol from unpurified spirit. Processes and apparatuses have also been proposed which make it possible to obtain absolute alcohol from unpurified spirit in a single cycle of operations. (French Patents 578,480 and 644,202.)

It has been proposed to draw the raw spirit of 94% from the rectifying column to the dehydration column and to purify the alcohol after this dehydration in two columns. Furthermore it has been proposed to purify the alcohol of 50% before it has been rectified; this comes out to a displacement of the purifying column and the addition of a further column, compared with the just described process; the process therefore works with five columns. The above described process needs four columns.

In contradistinction to this process, the object of the present invention is to provide an apparatus and process which make it possible to work up raw spirit direct to pure absolute alcohol and to achieve this result with a total of three columns.

A further column as shown in the drawing may be used in any of the described three processes to separate the last traces of the addition-liquid.

It was demonstrated that the two above mentioned purification columns can be eliminated and that on the other hand a pure absolute alcohol can only then be obtained if the anhydrous alcohol from the dehydrating column is subsequently treated in a last runnings column.

The advantage compared with known processes resides in the considerable saving of vapour effected by the new method and in the yield of completely pure alcohol.

According to the improved process the raw spirit is introduced as usual in the case of azeotropic distillation with the addition-liquid into the upper part of the dehydrating column 1 through the pipe 2 if necessary with the aid of a rotary pump. As addition liquid a hydrocarbon is used forming with alcohol and water an azeotropic mixture. Also mixtures of such addition-liquids may be used. Preferably benzene and a mixture of benzene-benzine are applied. The known ternary mixture appears at 19 and 20 as distillate and contains all the impurities of the raw spirit occurring as first runnings during this rectification, to which belong also a part of the fusel oils appearing usually as subsequent runnings in the usual rectification. In the separating funnel 3 the distillate, if necessary with the addition of water, is separated into two layers. The layer, consisting of aqueous spirit and the impurities, is, contrary to processes hitherto known, introduced direct, through the pipe 5, to the rectifying column 6, over a heat exchanger. The spirit is here rectified to a high percentage spirit, while simultaneously the lighter boiling impurities originating from the starting product, the raw spirit, are concentrated at the top of the column and are removed at 8 over reflux 21 and final condensers 22.

In case the aqueous spirit still contains addition-liquid the latter passes over with the first runnings. From the latter the dehydrating agent is separated in the separating funnel 9 in case of need with the addition of water, through the overflow 10 and are again introduced to the dehydrating column 1 through the pipe 2 while the first runnings are drawn off at 11.

The fusel oils contained in the aqueous spirit are removed through a fusel oil separator 12 during rectification.

Furthermore by the present invention it has been established that the layer containing the addition-liquid advantageously may be drawn off from the separating funnel and again be introduced into the dehydrating column 1 through the pipes 4 and 2. It also has been shown that a further advantage may be obtained by drawing off below the top of the column 7 the high percentage alcohol and introducing same again to the dehydrating column 1 through the pipe 2 after the admixture of raw material. By this second dehydration absolute alcohol may be obtained.

As above mentioned only a part of the impurities of the raw spirit pass over with the distillate from the dehydrating column 1. The remaining impurities collect in water-free alcohol at the foot of the column 1. To remove these impurities the water-free alcohol is—as also shown by the present invention as a further characteristic—first introduced into a first runnings column 13 from which the last traces of the addition-liquid are distilled off at 23 and 24 and again introduced into the dehydrating column 1 through the pipe 14. The water-free alcohol purified from the addition substance leaves the column 13 at the base through pipe 15 and, contrary to known processes, is distilled off at 17, 25 and 26 from the higher boiling impurities in the subsequent runnings column 16. The subsequent runnings are drawn off at 18.

The process described does not work with methyl-alcohol, but apart from ethyl-alcohol also with the isometric propyl and butyl-alcohols.

We claim:

1. A process for the simultaneous and continuous dehydration and rectification of a raw alcohol containing from 2 to 4 carbon atoms in the molecule, such as an alcohol from which the greater portion of the water originally present has been removed so that a concentration of from 90 to 96% results, but which still contains the natural impurities originally present, which comprises the steps of adding benzol to the raw alcohol to produce an azeotropic mixture, distilling said azeotropic mixture, condensing the vapors of said mixture, separating said condensate into two liquid layers, one of which layers contains substantially all the benzol, the other of said layers containing the alcohol-water mixture and substantially all the distilled-over impurities, rectifying said latter layer and simultaneously separating the low boiling fraction of the impurities from the alcohol and removing them as first runnings at the top of the rectification zone, separating the higher boiling fraction of the distilled-over impurities from the alcohol as later runnings and removing them from the rectification zone, withdrawing the highly concentrated alcohol from the rectification zone and returning it to the distillation zone.

2. A process for the simultaneous and continuous dehydration and rectification of a raw alcohol containing from 2 to 4 carbon atoms in the molecule such as an alcohol from which a large portion of the water originally present has been removed so that a concentration of from 90 to 96% results, but which still contains the natural impurities originally present, which comprises the steps of adding benzol to the raw alcohol to produce an azeotropic mixture, distilling said azeotropic mixture, condensing the vapors of said mixture, separating said condensate into two liquid layers, one of which layers contains substantially all the benzol, while the other of said layers contains the alcohol-water mixture and substantially all the distilled-over impurities, rectifying said latter layer, simultaneously separating from said alcohol and removing as first runnings at the top of the rectification zone the low boiling fraction of the impurities present in said layer, separating the higher boiling fraction of the distilled-over impurities from the alcohol and removing them from the rectification zone as later runnings, withdrawing the highly concentrated alcohol from the rectification zone, returning said highly concentrated alcohol to the distillation zone, mixing said highly concentrated alcohol with the starting material, and subjecting the said mixture to a second dehydration.

3. A process for the simultaneous and continuous dehydration and rectification of a raw alcohol containing from 2 to 4 carbon atoms in the molecule such as an alcohol from which a large portion of the water originally present has been removed so that a concentration of from 90 to 96% results, but which still contains the natural impurities originally present, which comprises the steps of adding benzol to the raw alcohol to produce an azeotropic mixture, distilling said azeotropic mixture, condensing the vapors of said mixture, separating said condensate into two liquid layers, one of which layers contains substantially all the benzol, the other of said layers containing the alcohol-water mixture and substantially all the distilled-over impurities, rectifying said latter layer, simultaneously separating the low boiling fraction of the impurities from the alcohol and removing them as first runnings at the top of the rectification zone, separating the higher boiling fraction of the distilled-over impurities from the alcohol and removing them from the rectification zone as later runnings, withdrawing the highly concentrated alcohol from the rectification zone, returning said highly concentrated alcohol to the distillation zone, mixing said starting material therewith and subjecting the mixture to another dehydration, and returning said layer containing the benzol to the distillation zone.

DANIEL PETERS.
OTTO v. KEUSSLER.